United States Patent [19]
Yamakawa et al.

[11] Patent Number: 5,573,267
[45] Date of Patent: Nov. 12, 1996

[54] LID FOR AIR BAG DEVICE

[75] Inventors: Kazuhiko Yamakawa; Takayasu Zushi, both of Shiga, Japan

[73] Assignee: Takata Corporation, Tokyo, Japan

[21] Appl. No.: 489,289

[22] Filed: Jun. 9, 1995

[30] Foreign Application Priority Data

Jun. 13, 1994 [JP] Japan .................................. 6-130333

[51] Int. Cl.$^6$ .................................................. B60R 21/16
[52] U.S. Cl. ........................................ 280/728.3; 280/732
[58] Field of Search ............................... 280/728.3, 731, 280/732

[56] References Cited

U.S. PATENT DOCUMENTS

| | | | |
|---|---|---|---|
| 5,342,086 | 8/1994 | Harris et al. | 280/728.3 |
| 5,395,668 | 3/1995 | Ito et al. | 280/728.3 |

Primary Examiner—Kenneth R. Rice
Attorney, Agent, or Firm—Kanesaka & Takeuchi

[57] ABSTRACT

A mechanism for covering a casing accommodating an air bag therein is formed of a lid for covering the casing, mounting pieces protruding from a back surface of the lid for mounting the lid to the casing, and high strength portions. First and second tear lines are formed in the back surface of the lid to allow the lid to be torn along the first and second tear lines. The first tear line extends in the width direction of a vehicle, and the second tear lines intersect the first tear line. The high strength portions are disposed outside the second tear lines near the respective connecting corners between the first tear line and the second tear line. The high strength portions are ribs, which are disposed on the back surface of the lid and project such that the second tear lines extend along the ribs. The ribs continue from the mounting pieces to thereby prevent a tear, which has traveled along the first tear line, from further traveling sideways at the connecting corners.

5 Claims, 10 Drawing Sheets

LID FOR AIR BAG DEVICE

FIELD OF THE INVENTION

The present invention relates to a lid for an air bag device installed in a vehicle for protecting an occupant, particularly to a lid with tear lines. The present invention relates more particularly to a lid suitable for an air bag device for an occupant in a passenger seat.

BACKGROUND OF THE INVENTION

In an air bag device for an occupant in a passenger seat, a casing (sometimes referred to as a container) accommodates an air bag and an inflator therein and has a lid to cover an opening of the casing. The lid is sometimes referred to as a cover door or a deployment door. The inflator acts to deploy the air bag in the event of a collision so that the lid is pushed by the deploying air bag and then opens toward the cabin of the vehicle. As a result, the air bag is deployed widely to the vehicle cabin.

The lid is designed to be provided with tear lines so that the lid is torn along the tear lines, to make a flap therein which opens toward the vehicle cabin.

With reference to FIGS. 10 through 12, the description will now be made with regard to a structure of a conventional air bag device and the operation thererof for an occupant in the passenger seat, which has such a lid with tear lines. FIG. 11 is a sectional view taken along a line XI—XI in FIG. 10, and FIG. 12 is a view for explaining the operation thereof. In the air bag device 10, an air bag 14 in its folded state is accommodated in a casing 12. The casing 12 is provided with an inflator 16 for deploying the air bag 14. The casing 12 has an opening in the front side or the upper side thereof to face toward the vehicle cabin. A lid 18 is arranged to cover the opening of the casing 12. The lid 18 has a structure comprising a main body 18a made of synthetic resin and a metallic reinforcing plate 18b provided inside (or in a rear portion of) the main body 18a. A numeral 20 designates an opening in an instrument panel 22 for mounting the air bag device.

The lid 18 is provided with a first tear line 28 and second tear lines 24, 26. The second tear line 24 extends along a left side of the vehicle body and the second tear line 26 extends along a right side of the vehicle body. The first tear line 28 extends so that one end of the second tear line 24 and one end of the second tear line 26 are connected to each other via the first tear line 28.

In order to attach the lid 18 to the casing 12, the lid is provided with mounting pieces 32, 34 projecting therefrom. The mounting pieces 32, 34 are fixed to the casing 12 by rivets or bolts 36, 38, respectively.

As the vehicle mounted with the air bag 10 comes into collision, the inflator 16 acts to deploy the air bag 14 and the air bag 14 then pushes the lid 18. Therefore, the lid 18 is torn along the tear lines 24, 26, and 28, with the result that a flap 30 surrounded by the tear lines 24, 26, and 28 opens like a door as shown in FIG. 12. Therefore, the air bag 14 deploys widely in the vehicle cabin.

Though the tear lines 24, 26, and 28 are disposed to form a C-shape in FIGS. 10 through 12, tear lines 24a, 26a, and 28a of a lid 18' may be disposed to form a H-shape as shown in FIG. 13. In this case, a flap 32 of the lid 18' opens upwardly as shown by an arrow A, and a flap 34 of the lid 18' opens downwardly as shown by an arrow B. A numeral 22a designates an instrument panel.

Such tear lines may be formed by cutting grooves continuously along a line to be torn or in a dotted line like a seam. It should be noted that some grooves may be deeply formed at intervals. In case where the cover has a double-layered structure with a hard layer and a soft layer, a slit may be formed in the hard layer along a line to be torn.

As mentioned above, in the conventional air bag device, a tear begins to travel along the first tear line 28 or 28a and subsequently travels along the second tear lines 24 and 26 or 24a and 26a due to the spread of the tear so that the lid opens widely.

The first tear line 28 or 28a and the second tear lines 24 and 26 or 24a and 26a intersect substantially at a right angle in connecting corners therebetween. Therefore, there is a possibility that the tear traveling along the first tear lines 28 or 28a also travels substantially straight in the lid toward the Sides of the vehicle body by inertia.

OBJECT AND SUMMARY OF THE INVENTION

It is an object of the present invention to provide a lid which allows a tear traveling along a first tear line to securely change its course at connecting corners between the first tear line and second tear lines so that the tear does not travel subsequently anywhere but the second tear lines.

The lid of an air bag device of the present invention, for covering a casing accommodating an air bag therein, comprises a first tear line which extends in the width direction of a vehicle body of a vehicle, and second tear lines which are connected from the first tear line and extend in a direction to intersect the first tear line, wherein the first tear line and the second tear lines are formed in the back surface of the lid to allow the lid to be torn along these tear lines. The lid is provided with high strength portions disposed outside the second tear lines near connecting corners between the first tear line and the second tear line to prevent a tear, which has traveled along the first tear line, from further traveling sideways at the connecting corners.

In the lid of the air bag device of the present invention, even when the tear which has traveled along the first tear line has a tendency to further travel straight across the second tear lines, ends of the tear stop at the high strength portions, thereby preventing tear from advancing straight any more.

It is preferable that the high strength portions comprise ribs which are disposed on the back surface of the lid and project therefrom.

When each end of the tear, which has traveled along the first tear line, reaches the connecting corner between the first tear line and each of the second tear lines, each rib stands like a wall in front of each the tear. Therefore, the ribs like walls prevent the tear from traveling in the directions as it used to, with the result that the lid is subsequently torn only along the tear lines The lid is preferably provided with mounting pieces protruding from the back surface thereof for mounting the lid to the casing wherein the ribs are continued from the mounting pieces and the second tear lines extend along the ribs.

Since the second tear lines extend along the ribs, the tear is guided by the ribs so as to travel quite smoothly. When the ends of the tear, which has traveled along the second tear lines, reach the mounting pieces, the further traveling of the tear is prevented.

The thickness of the ribs is preferably greater than that of the lid.

Since the thickness of the ribs is greater than the that of the lid, the tear which has traveled along the first tear line changes its course smoothly to travel along the second lines.

It is preferable that the high strength portions are formed by making the thickness of portions of the lid outside the second tear lines greater than the thickness of portions of the lid inside the second tear lines.

When each end of the tear which has traveled along the first tear line reaches the connecting corner between the first tear line and each of the second tear lines, the portion having the greater thickness exists in front of the tear. Therefore, the tear changes its course smoothly to the second tear lines so as to travel along the second tear lines rapidly.

DESCRIPTION OF THE PREFERRED EMBODIMENTS

Hereinafter, embodiments of the present invention will be described in detail with reference to the drawings.

Figure 1:
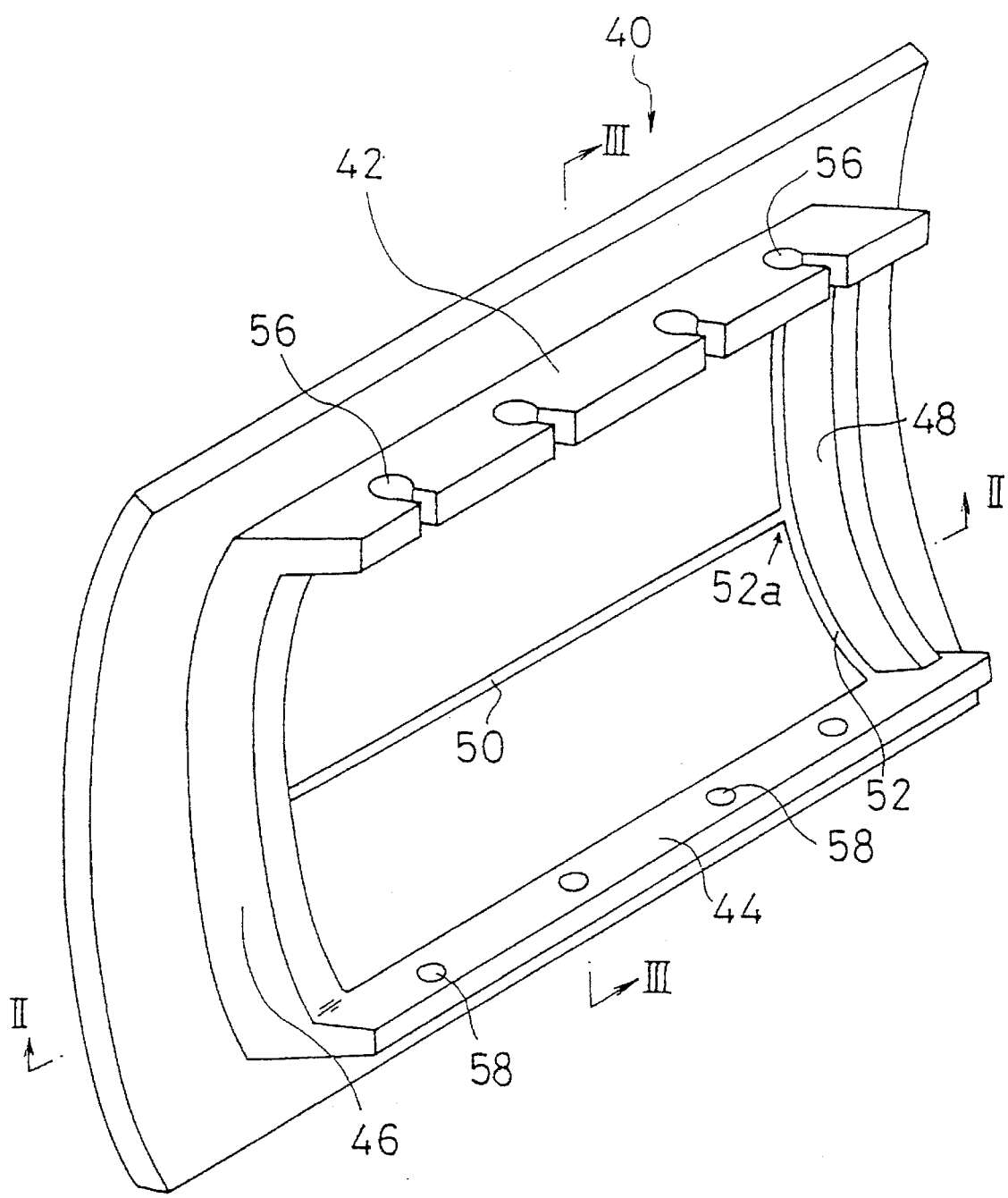
FIGS. 1 is a perspective view of a lid 40 of an air bag device for an occupant in a passenger seat in accordance with an embodiment of the present invention.
Figure 2:
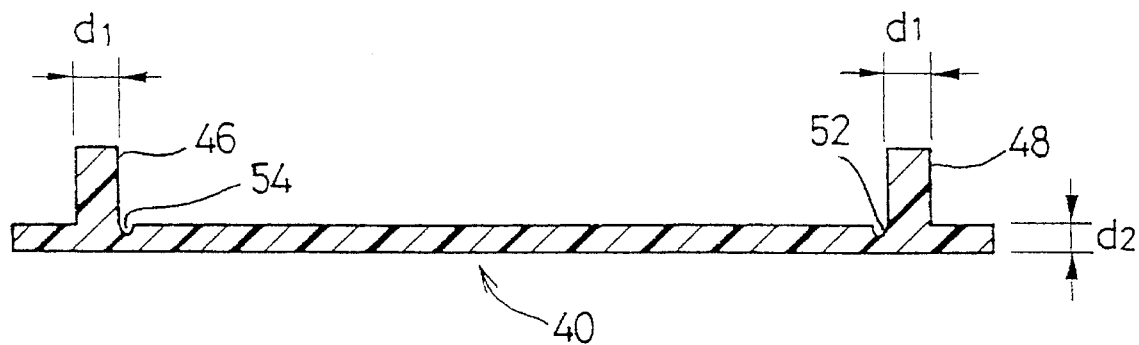
FIG. 2 is a sectional view taken along a line II—II in FIG. 1.
Figure 3:
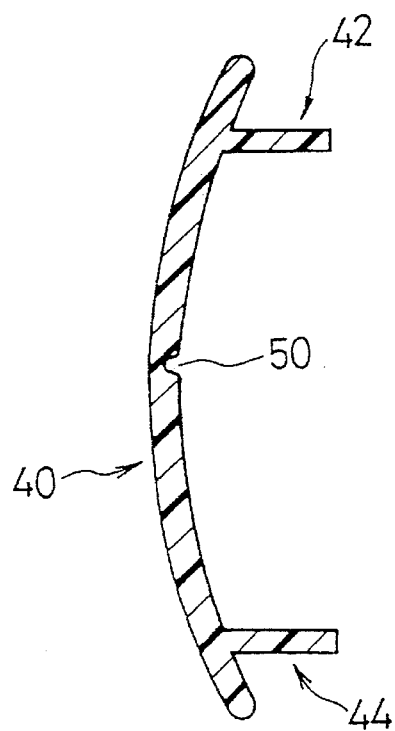
FIG. 3 is a sectional view taken along a line III—III in FIG. 1.

FIG. 1 is a perspective view of a lid 40 of an air bag device for an occupant in a passenger seat, showing the back thereof, in accordance with an embodiment of the present invention and FIG. 2 and FIG. 3 are sectional views taken along a line II—II and a line III—III in FIG. 1, respectively.

The lid 40 is provided with mounting pieces 42, 44 and ribs 46, 48 on a back surface thereof so as to form a frame-like shape.

The lid 40 is a resin product made by a one-color injection molding process. In this embodiment, the lid 40 is provided with a first tear line 50 extending in a center thereof and along a longitudinal direction provided with second tear lines 52, 54 extending along bases of ribs 48, 46, respectively. The thickness $d_1$ of the ribs 46, 48 is greater than the thickness $d_2$ of the lid 40. Numerals 56 and 58 designate holes for bolts or rivets for fixing the mounting pieces 42 and 44.

Also in this embodiment, as the back of lid 40 is pushed by the deployment of the air bag, a tear starts around the center of the first tear line 50 and then travels rightward and leftward along the first tear line 50. When each end of the tear then reaches the connecting corner between the first tear line 50 and each of the second tear lines 52, 54, each rib 46, 48 stands like a wall in front of each advancing end of the tear. In addition, the ribs 46 and 48 are substantially never torn due to the greater thickness thereof. Therefore, each end of the tear securely changes its course at right angle so that the tear travels along the second tear lines 52, 54. As a result of this, the lid 40 can be securely torn along the tear lines 50, 52, and 54.

It should be noted that the tear traveling along the second tear lines comes to in contact with the mounting pieces 42, 44 and then stops. Therefore, the lid is not torn too much.

As a result of various tests, as for the lid 40 shown in FIGS. 1 through 3, the thickness $d_1$ of the ribs 46, 48 is preferably between 110% and 200% when the thickness $d_2$ of the lid 40 is assumed to be 100%.

Figure 4:
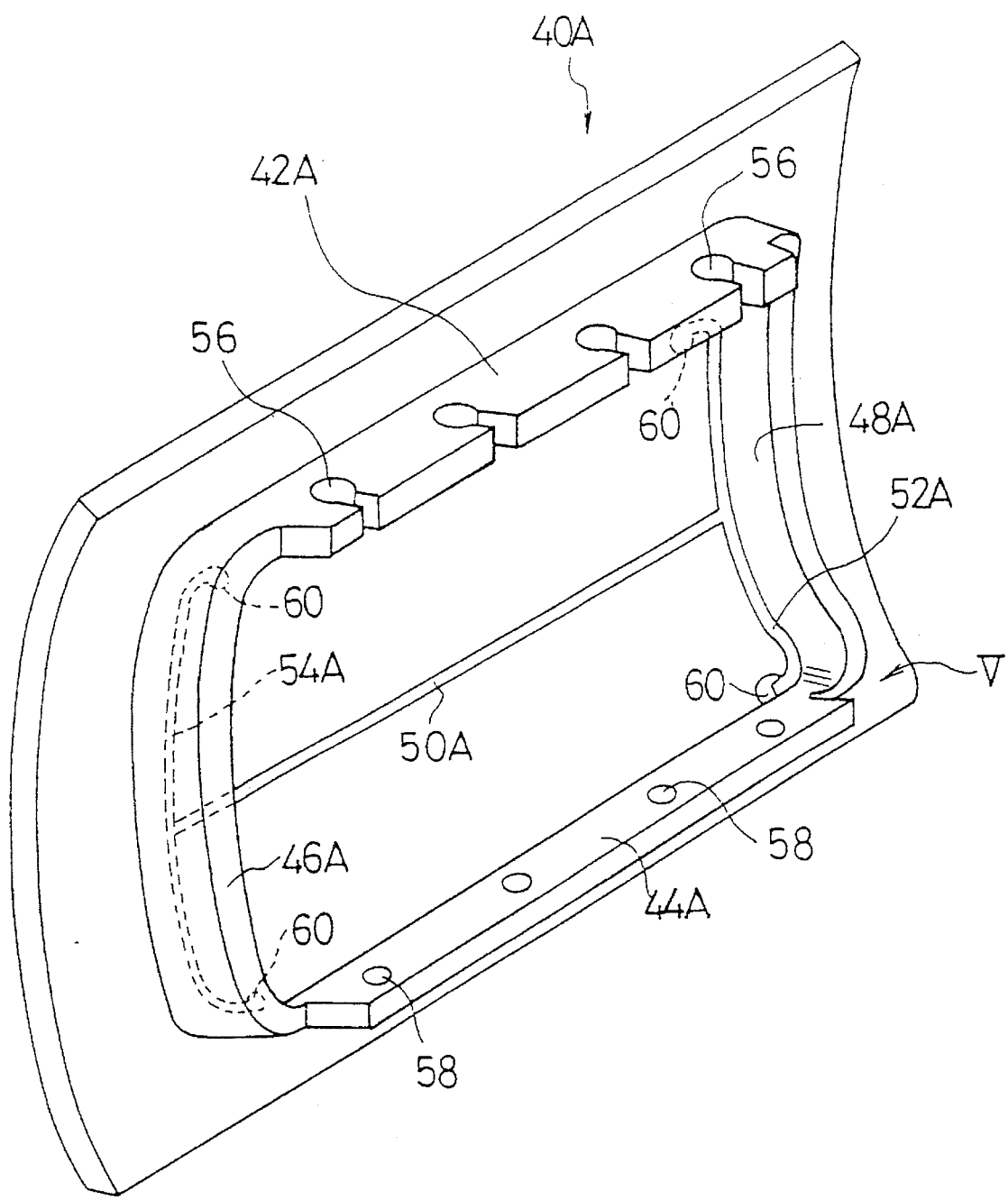
FIG. 4 is a perspective view of a lid 40A in accordance with another embodiment.
Figure 5:
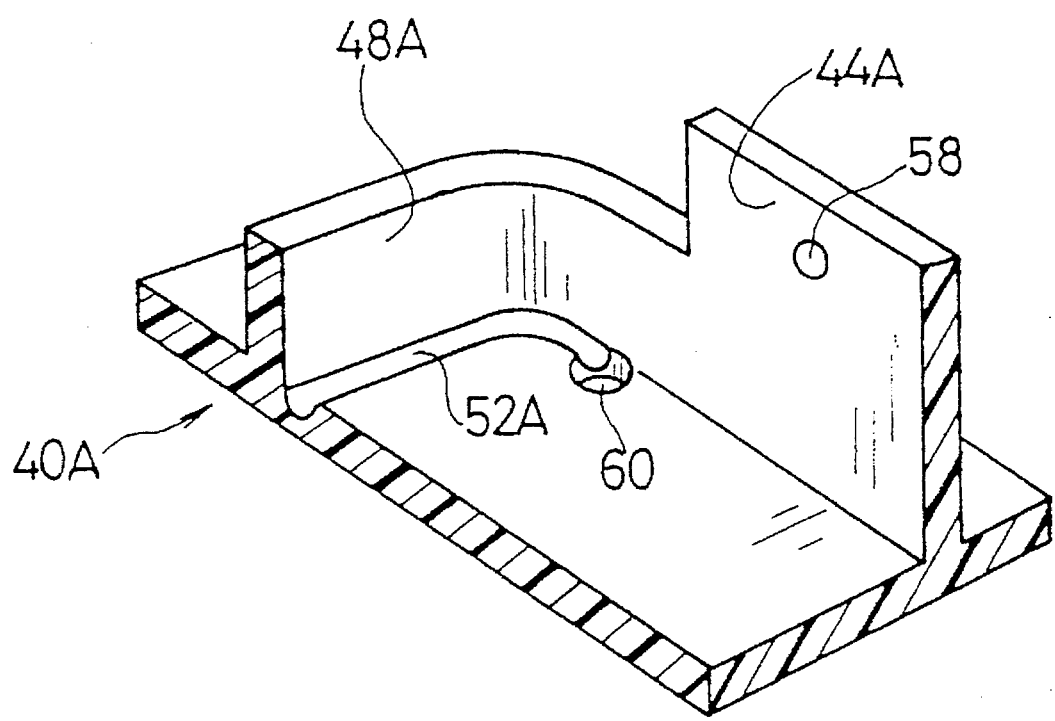
FIG. 5 is a perspective sectional view of a portion V shown in FIG. 4.

FIG. 4 is a perspective view of a lid 40A in accordance with another embodiment of the present invention and FIG. 5 is an enlarged view of a portion V shown in FIG. 4.

In this embodiment, both ends of ribs 46A, 48A are smoothly bent in an arc-like shape to continue to mounting pieces 42A, 44A. Portions near about both ends of second tear lines 52A, 54A are also bent along the curves of the ribs 46A, 48A. The second tear lines 52A, 54A are provided with stop holes 60 at the both ends thereof, respectively. Each stop hole 60 is a circular recess.

The force of the tear traveling along the second tear lines 52A, 54A is weakened by approaching the connecting corners between the ribs 46A, 48A and the mounting pieces 42A, 44A and the ends of the tear then stop at the stop holes.

Figure 6:
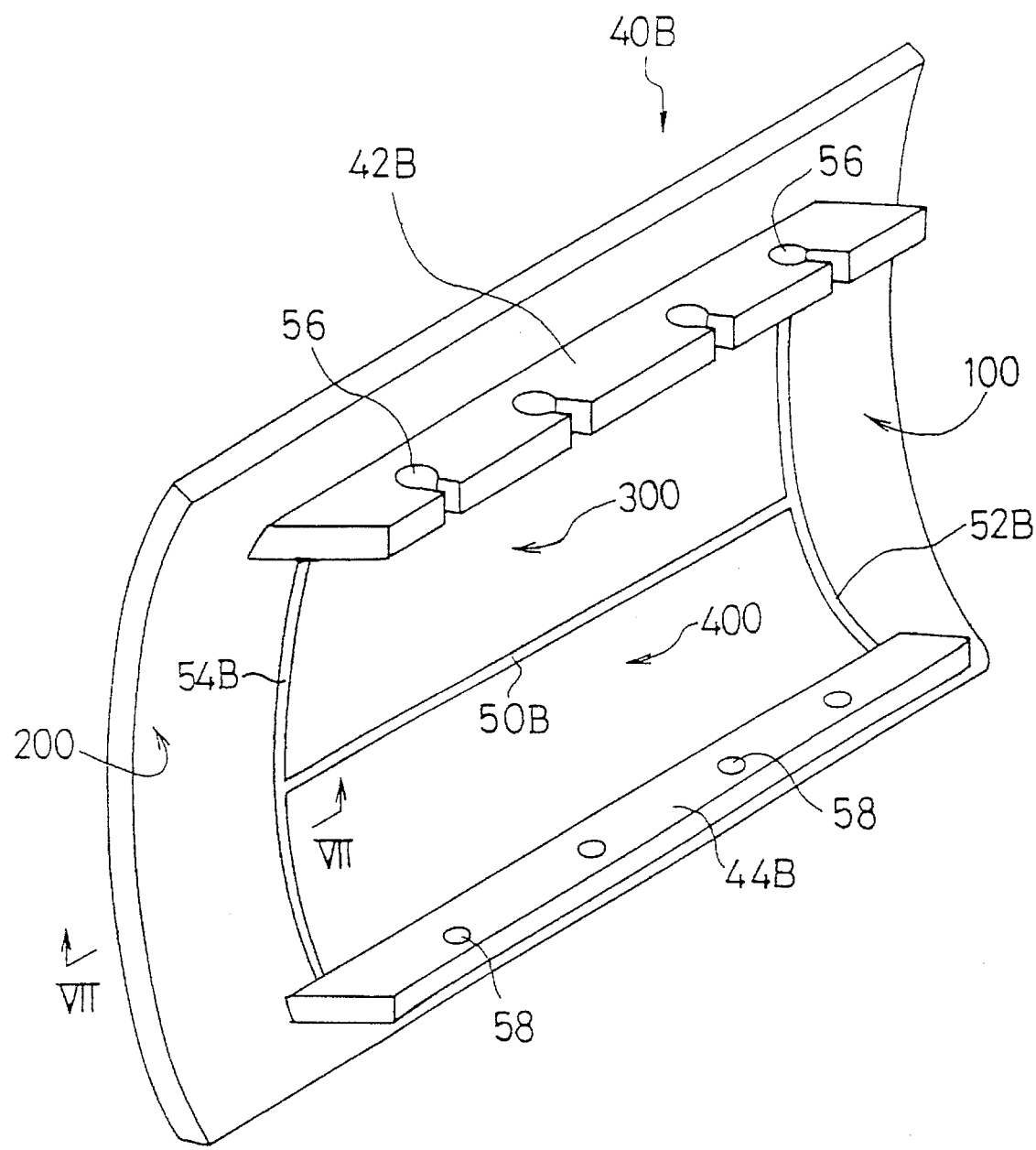
FIG. 6 is a perspective view of a lid 40B in accordance with another embodiment.
Figure 7:
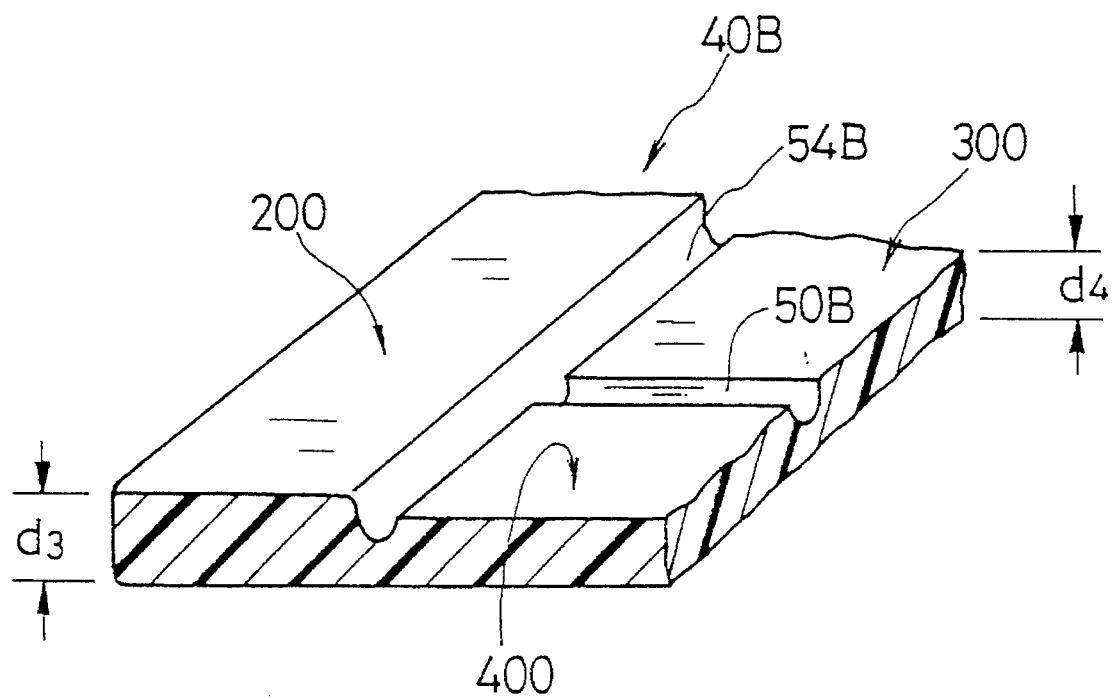
FIG. 7 is a perspective view of a section taken along a line VII—VII in FIG. 6.

FIG. 6 is a perspective view of a lid 40B in accordance with another embodiment of the present invention and FIG. 7 is a perspective view of a section taken along a line VII—VII in FIG. 6.

In this embodiment, the ribs as mentioned in the above embodiments are omitted. Instead, the thickness $d_3$ of portions 100, 200 outside second tear lines 52B, 54B (i.e. each portion between each of the tear lines 52B, 54B and each of the sides of the lid 40B) is greater than the thickness $d_4$ of portions 300, 400 inside the second tear lines 52B, 54B.

In the lid 40B as structured above, a tear traveling straight along a first tear line 50B, ends of which reach the second tear lines 52B, 54B, do not travels straight any more since the thickness $d_3$ of the portions 100, 200 is greater. Each end of the tear changes its course at a right angle smoothly. Then, the tear begins to travel along second tear lines 52B, 54B rapidly. The tear traveling along the second tear line 52B, 54B reaches mounting pieces 42B, 44B so as to stop.

As for the lid 40B shown in FIGS. 6 and 7, the thickness $d_3$ of the portions 100, 200 is preferably between 120% and 300% more preferably between 140% and 250%, when the thickness $d_4$ of the portion 300, 400 is assumed to be 100%.

Figure 8:
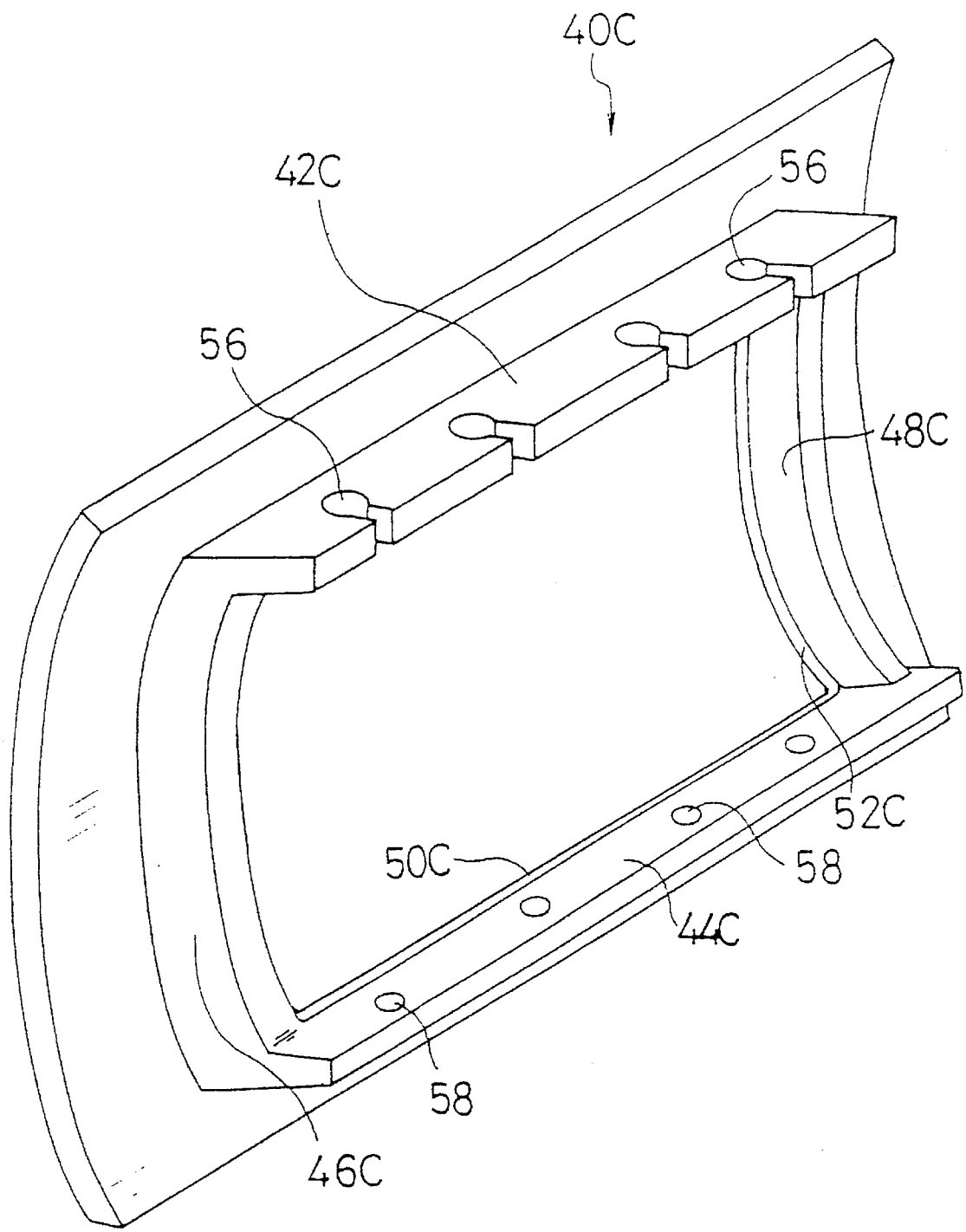
FIG. 8 is a perspective view of a lid 40C showing the back thereof in accordance with another embodiment.
Figure 9:
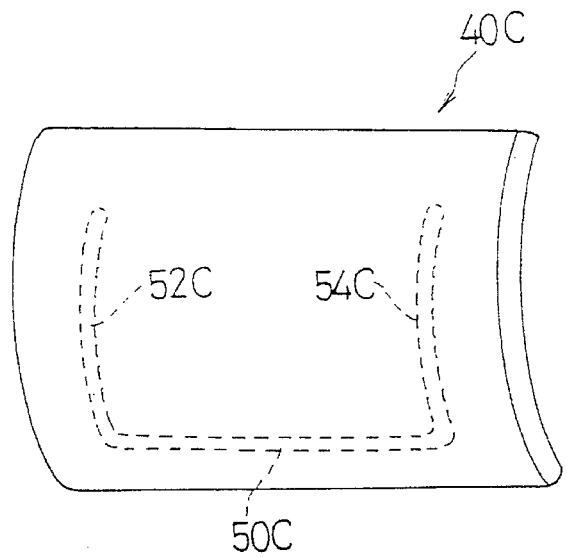
FIG. 9 is a perspective view of the lid 40C showing the front thereof in accordance with the embodiment.
Figure 10:
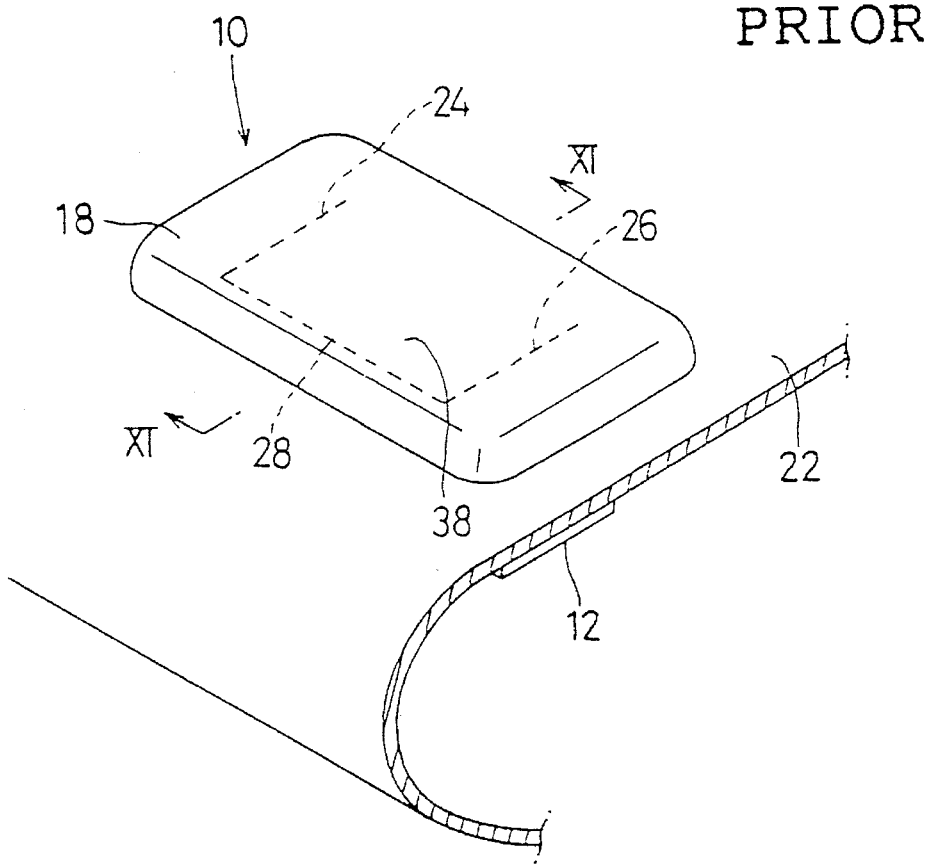
FIG. 10 is a perspective view showing a conventional air bag device for an occupant in a passenger seat.
Figure 11:
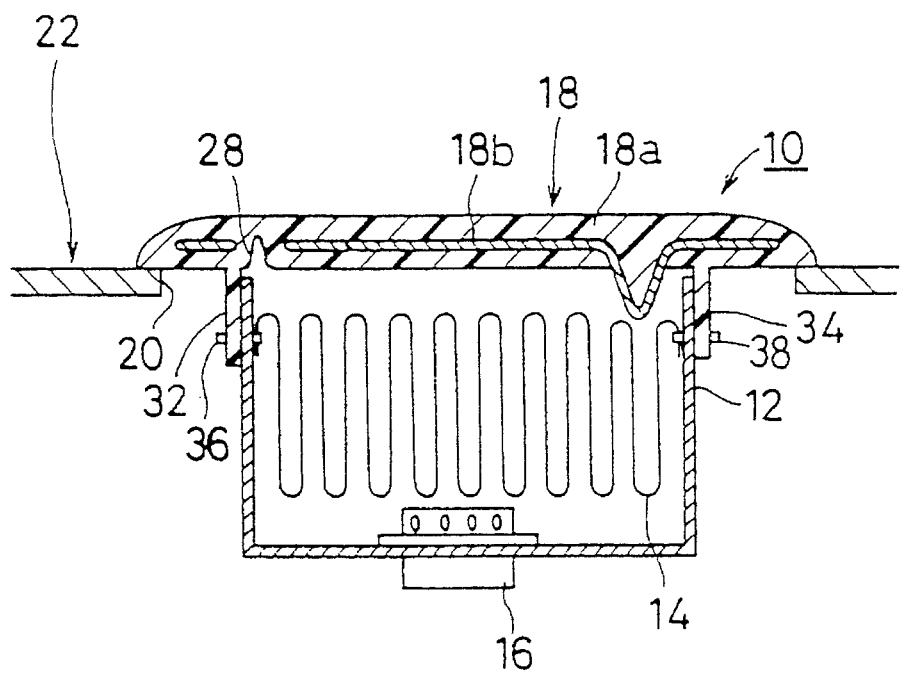
FIG. 11 is a sectional view taken along a line XI—XI in FIG. 10.
Figure 12:
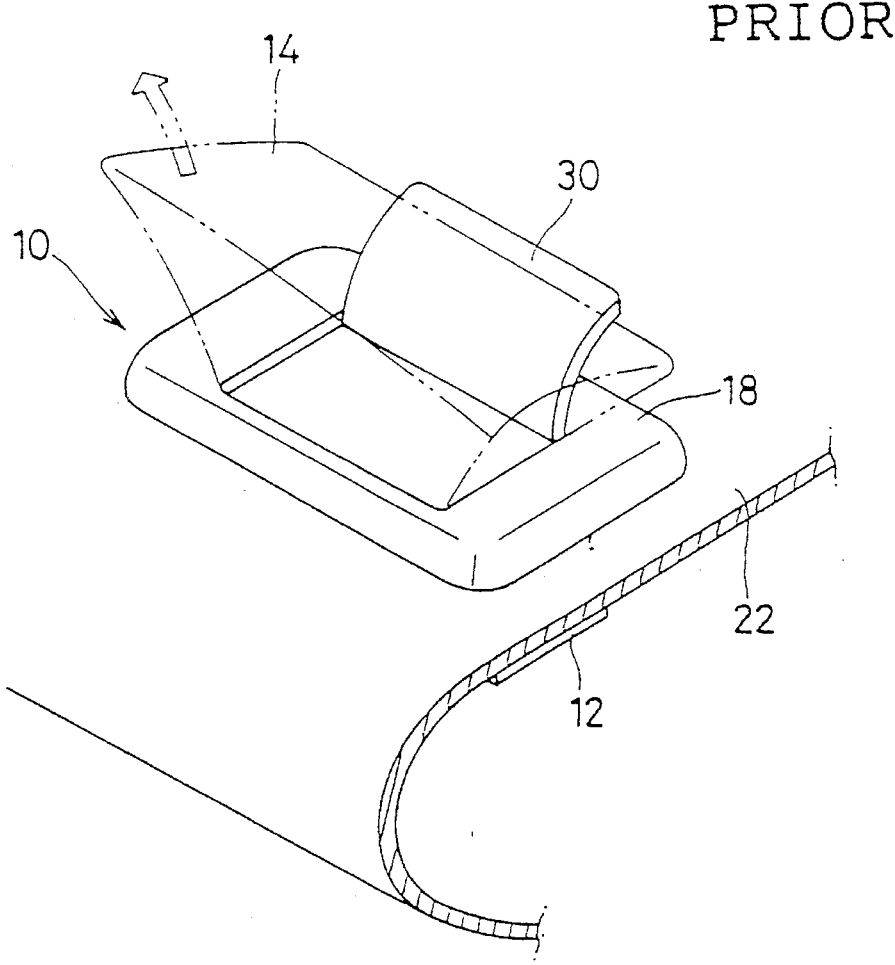
FIG. 12 is a perspective view showing the operation of a lid of the conventional air bag device.
Figure 13:
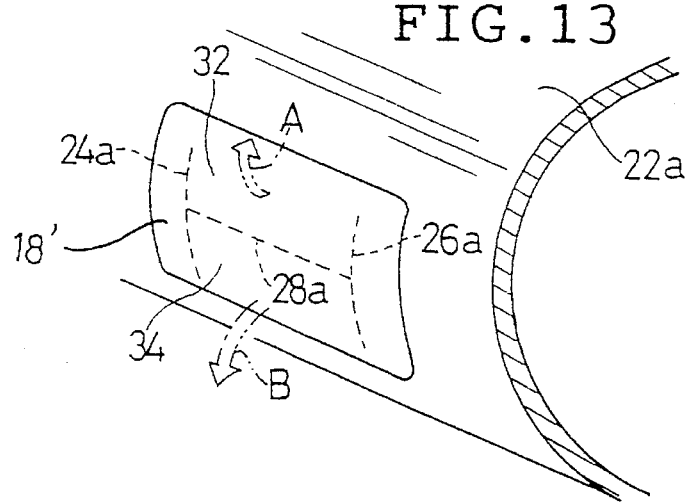
FIG. 13 is a perspective view showing another conventional air bag device for an occupant in a passenger seat.

Though the tear lines are arranged to form an H-like shape as a whole in the above embodiments, tear lines 50C, 52C, 54C of lid 40C may be arranged to form a C-like shape as shown in FIGS. 8 and 9. In FIG. 8, numerals 42C, 44C designate mounting pieces and numerals 46C, 48C designate ribs.

Though the above mentioned embodiments relate to the lid of the air bag device for an occupant in a passenger seat, the present invention can apply to a lid of an air bag device for an occupant in a rear seat.

As mentioned above, in the lid of the air bag device according to the present invention, the lid is torn securely along the first tear line and the second tear lines when the air bag is deployed by the operation of the air bag device, with the result that the air bag is rapidly and securely deployed in the vehicle cabin widely.

What we claim is:

1. A mechanism for covering a casing accommodating an air bag therein, comprising:

a lid covering said casing;

first and second tear lines, formed in a back surface of said lid, allowing said lid to be torn along said first and second tear lines, said first tear line extending in the width direction of a vehicle body of a vehicle, said second tear lines being connected to said first tear line and extending in a direction to intersect said first tear line;

mounting pieces protruding from the back surface of the lid for mounting said lid to said casing; and high strength portions disposed outside each of said second tear lines near connecting corners between said first tear line and each of said second tear lines, said high strength portions being formed of ribs disposed on the back surface of the lid and projecting therefrom such that the second tear lines extend along the ribs, said ribs continuing from the mounting pieces to thereby prevent a tear, which has traveled along said first tear line, from further traveling sideways at said connecting corners.

2. A mechanism as claimed in claim 1, wherein the thickness $d_1$ of said ribs is greater than the thickness $d_2$ of said lid.

3. A mechanism as claimed in claim 2, wherein the thickness $d_1$ of the ribs is between 110% and 200% when the thickness $d_2$ of said lid is assumed to be 100%.

4. A mechanism as claimed in claim 1, wherein said first and second tear lines are connected to form an H-like shape as a whole when seen from the back of said lid.

5. A mechanism as claimed in claim 1, wherein said first and second tear lines are connected to form a C-like shape as a whole when seen from the back of said lid.

* * * * *